United States Patent [19]

Ohtsuka et al.

[11] Patent Number: 4,591,454
[45] Date of Patent: May 27, 1986

[54] APPARATUS AND METHOD FOR MELTING AND TREATING METAL WASTES

[75] Inventors: Katsuyuki Ohtsuka, Mito; Ryukichi Mizuno; Koji Yanagida, both of Ibaragi; Kazuo Kitagawa; Atsuhiro Ochiai, both of Kobe; Minoru Harada, Matsudo; Hiroshi Matsumoto, Kobe, all of Japan

[73] Assignee: Doryokuro Kakunenryo Kaihatsu Jigyodan, Tokyo, Japan

[21] Appl. No.: 642,750

[22] Filed: Aug. 21, 1984

Related U.S. Application Data

[63] Continuation of Ser. No. 368,437, Apr. 14, 1982, abandoned.

[30] Foreign Application Priority Data

Apr. 14, 1981 [JP]  Japan .................................. 56-56548
Oct. 15, 1981 [JP]  Japan ................................. 56-165050

[51] Int. Cl.[4] ............................ G21F 9/34; G21F 9/00
[52] U.S. Cl. .................................... 252/626; 164/441;
  219/121 PB; 252/632
[58] Field of Search ...................... 252/626, 627, 628;
  219/121 P, 121 PA, 121 PB, 121 PY; 164/441;
  241/DIG. 38; 266/901; 425/6; 373/22

[56] References Cited

U.S. PATENT DOCUMENTS

| 3,924,672 | 12/1975 | Paton et al. ........................ 164/515 |
| 4,036,278 | 7/1977 | Ramacciotti ................. 164/DIG. 6 |
| 4,202,401 | 5/1980 | Latash et al. ....................... 164/515 |
| 4,326,842 | 4/1982 | Adachi et al. ....................... 252/626 |
| 4,341,915 | 7/1982 | Adachi et al. ....................... 252/626 |
| 4,358,084 | 11/1982 | Bowman ...................... 164/DIG. 6 |

FOREIGN PATENT DOCUMENTS

| 3002695 | 8/1980 | Fed. Rep. of Germany ...... 252/626 |
| 3002697 | 8/1980 | Fed. Rep. of Germany ...... 252/626 |
| 3002696 | 8/1980 | Fed. Rep. of Germany ...... 252/626 |
| 3009314 | 10/1980 | Fed. Rep. of Germany ...... 252/626 |

Primary Examiner—Stephen J. Lechert, Jr.
Assistant Examiner—Howard J. Locker
Attorney, Agent, or Firm—Oblon, Fisher, Spivak, McClelland & Maier

[57] ABSTRACT

An apparatus for melting and treating metal wastes including radioactive wastes, including a melting and treating vessel formed of the upper surface of a truck and split mold, wherein metal wastes are charged into the vessel in a closed system and melted by an electroslag melting method using a non-consumable electrode. This invention also provides a method which includes the steps of charging a slag melt starting agent and slag into the vessel in layers, and passing electricity through the non-consumable electrode to thereby heat the starting agent.

1 Claim, 8 Drawing Figures

APPARATUS AND METHOD FOR MELTING AND TREATING METAL WASTES

This application is a continuation of application Ser. No. 368,437, filed Apr. 14, 1982 (abandoned).

BACKGROUND OF THE INVENTION

1. Field of the Invention

The present invention relates to an apparatus for melting and treating metal wastes, such as radioactive metal wastes from nuclear power plants and metal scrap from polluted equipment, and to a melting and treating method using said apparatus. More particularly, it relates to a melting and treating apparatus and method capable of safely and efficiently reducing the volume of polluted metal wastes in a closed system.

2. Description of the Prior Art

With the advancement of atomic energy application technology, the amount of radioactive metal wastes is increasing as is metal scrap from polluted equipment. At present, these kinds of wastes are sealed in drum cans, containers and the like and stored in the site, but the limited storage capacity calls for a volume reduction.

So far as combustible radioactive wastes are concerned, such volume reduction treating technique based on incineration has been established, and incinerators for radioactive combustible wastes have been installed or are scheduled to be installed in atomic power plants and atomic energy research institutes. As for incombustible materials, such as radioactive metal wastes, a volume reduction method comprising fragmentization and compression is being practiced but can hardly be said to have achieved sufficient volume reduction.

As for volume reduction treating methods handling various metal wastes, melting and treating methods are known. With these methods, it is possible to achieve high-density volume reduction of metal wastes, and the very high mechanical strength of the cooled solidified mass provides certain merits including easy handling and rare occurrence of re-diffusion (efflux, disintegration and dispersion, etc. of harmful metals). Such melting and treating methods include an electroslag melting method, a high frequency melting method, a plasma arc melting method, a nonconsumable electrode arc melting method induction slag melting method, etc.

Therefore, application of said melting and treating methods to radioactive metal wastes may be contemplated, but to put such methods in practical use it is necessary to ensure prevention of radioactive pollution during the melting and treating operation.

SUMMARY OF THE INVENTION

A first object of the invention is to provide an apparatus for melting and treating harmful metal wastes, such as radioactive-element containing wastes, safely without causing radioactive pollution.

Another object of the invention is to provide an apparatus capable of efficiently melting and treating metal wastes in a closed system by employing the electroslag melting method.

A further object of the invention is to provide an apparatus adapted to facilitate the assembly of a mold which constitutes a melting oven, the charging of metal wastes and slag into said mold, and the insertion of a non-consumable electrode for heating purposes.

Another object of the invention is to provide a method which ensures smooth and quick starting of slag melting when metal wastes are to be melted and treated using said apparatus.

Other objects will appear from the following description.

The objects described above have been achieved by employing the arrangement of the present invention to be fully described below.

The most important points of the apparatus according to the invention reside in an apparatus for electroslag-melting and treating metal wastes and include the following elements:

(a) a water-cooled, cylindrical, bottom-opened mold divided into two parts substantially in the middle, said parts being adapted to be moved in the assembling and mold opening directions relative to each other;

(b) a truck disposed below said mold and movable in a direction which crosses the direction of movement of said split mold;

(c) a lifting bucket disposed above said mold for charging a material to be treated into the mold;

(d) shutters for closing or opening the passage between said mold and the lifted waiting position of the lifting bucket;

(e) a liftable non-consumable electrode to be inserted into the mold; and (f) a shield gas feed pipe for feeding a shield gas into the mold.

The most important points of the melting and treating method according to present invention are the (a) the step of assembling on the upper surface of a truck a water-cooled, cylindrical, bottom-opened mold divided into two parts substantially in the middle, said parts being movable in the assembling and mold opening directions relative to each other;

(b) the step of charging a slag melting initiator (hereinafter referred to as slag melt starting agent) and slag into the mold in layers by using a lifting bucket for charging a material to be treated disposed above said mold;

(c) the step of lifting the lifting bucket to its shunted position and shutting off said bucket and mold from each other by shutters;

(d) the step of lowering a liftable non-consumable electrode disposed above the mold, through a hole in said shutter until its front end reaches said melt starting agent layer, passing electricity therethrough to ignite the slag melt starting agent to start the melting of the slag, and continuing passage of electricity to melt the slag;

(e) the step of lifting the non-consumable electrode to its shunted position, opening the shutters and charging metal wastes into the mold by using said lifting bucket; and (f) the step of closing the shutters, blowing inert gas into the mold, lowering the non-consumable electrode until its front end is immersed in the molten slag layer, and passing electricity to melt the metal wastes by Joule heat.

With the present invention, metals which retain radioactive and metal wastes polluted with radioactivity material are melted and treated in a completely sealed state. Further, since the pollutants move to the slag in the electroslag melting step, the radioactivity level of the metals themselves can be considerably lowered, while handling and storage are greatly facilitated by the volume reduction effect. The compacted mass of metal with its radioactivity level lowered by removal of pollutants of the slag may be subjected to dumping which does not require sealing-in, or in some cases may be reused. Thus, the present invention is most effective for use as an apparatus for melting and treating radioactive metal wastes, but it goes without saying that it is applicable to volume reduction treatment of other harmful metal wastes.

BRIEF DESCRIPTION OF THE DRAWINGS

Various other objects, features and attendant advantages of the present inention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
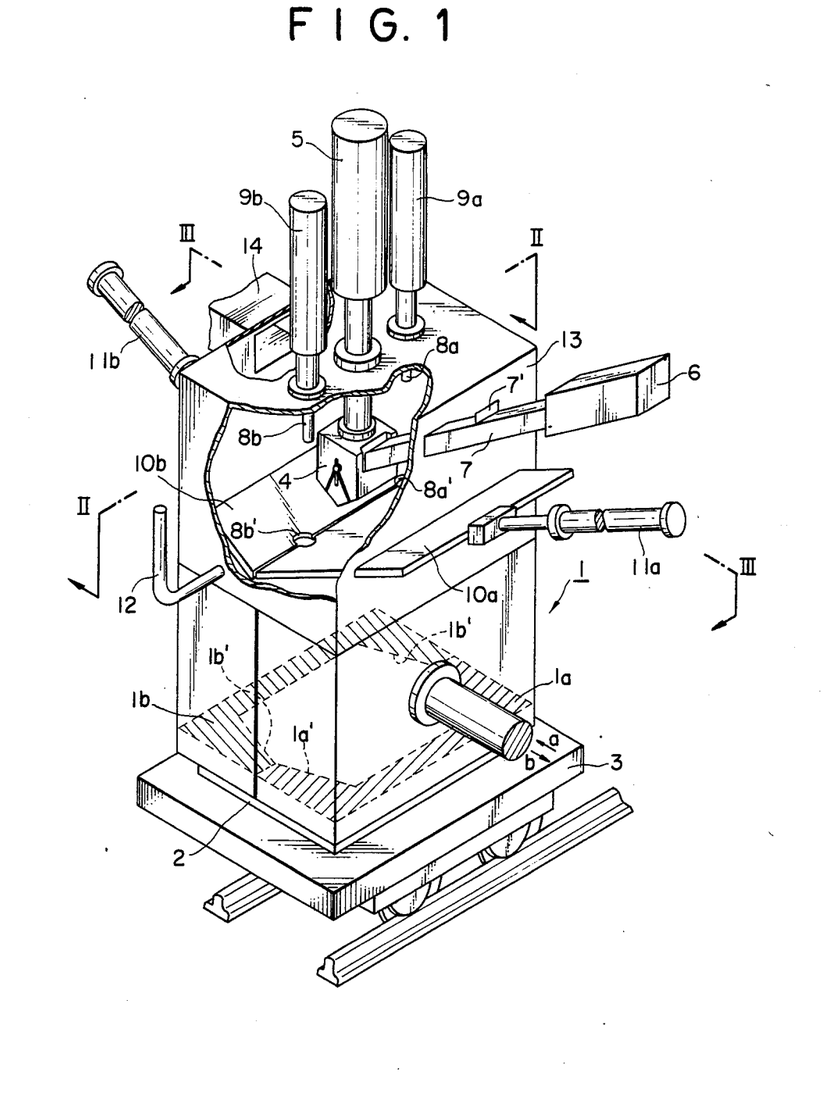
FIG. 1 is a sketch, partly broken away, showing by way of example a melting and treating apparatus according to the present invention.
Figure 2:
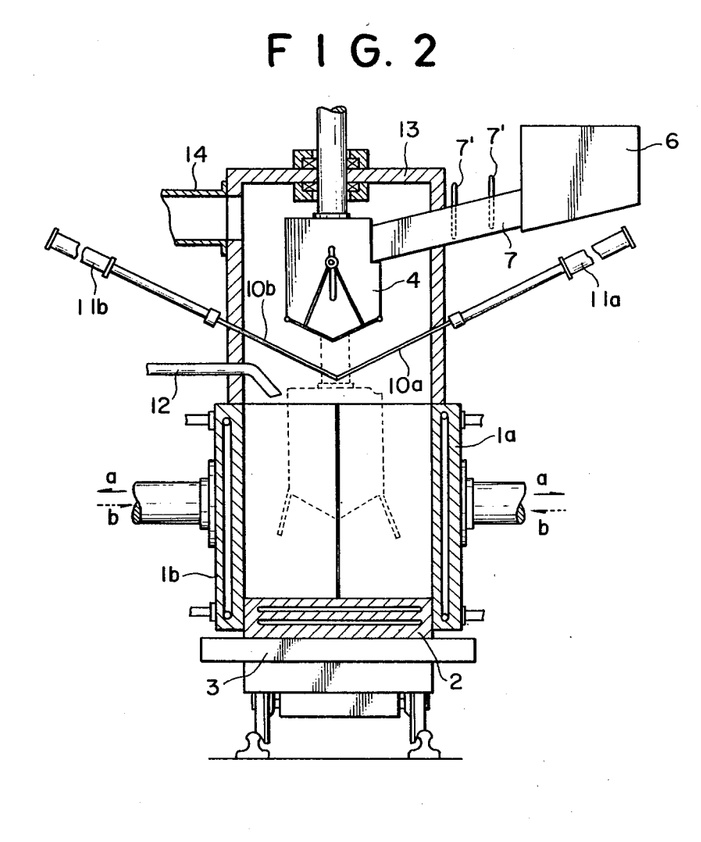
FIG. 2 is a section taken along the line II—II in FIG. 1.
Figure 3:
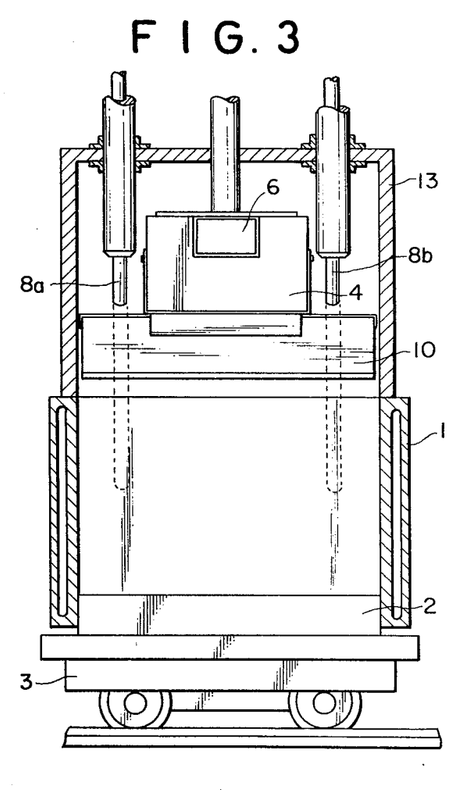
FIG. 3 is a section taken along the line III—III in FIG. 1.

FIGS. 1-3 show an embodiment of the invention. A mold 1 is longitudinally divided into two parts 1a, 1b substantially in the middle, said parts having inner taper surfaces 1a′, 1b′ with the distance therebetween enlarging toward the dividing plane, as shown in FIG. 1. The mold parts are of water cooled construction, as shown in FIG. 2, and are adapted to be moved toward and away from each other in the directions of arrows a and b by a suitable drive source. A water cooled surface plate 2 is disposed on the lower open side of the mold 1 and supported on a truck 3. The mold 1 and the surface plate 2 are preferably made of copper in consideration of its high heat conductivity and electric conductivity a high durability. The truck 3 sometimes may not properly mount the surface plate, in which case an arc starting agent is used to start electroslag melting. If the truck 3 does mount the surface plate, arc starting can be effected directly by surface plate arc method without using any arc starting agent. For this reason, it is desirable that the surface plate be made of electrically conductive material. A bucket 4 for charging a material to be treated is disposed above the mold and adapted to be lowered toward the mold as by a cylinder 5. A material to be treated is charged into the bucket from an oscillation feeder 6 through a chute 7. The reference character 7′ denotes a shutter. Non-consumable electrodes 8a and 8b for electroslag melting are disposed on opposite sides of the bucket 4 and held by cylinders 9a and 9b through insulators, said electrodes being liftable. Disposed between the mold 1 and the bucket 4 are shutters 10a and 10b in the form of plates for shutting them off from each other, said shutters being adapted to be opened and closed by cylinders 11a and 11b, and a shield gas feed pipe 12 directed to the mold is disposed below said shutters. The bucket 4 and non-consumable electrodes 8a and 8b are housed in a cover 13 disposed above the mold to shut off the treating atmosphere from the open air, with dust and exhaust gases from melting operation being discharged outside the system through a duct 14.

The melting and treating of metal wastes (materials to be treated) using such apparatus is performed in the following procedures.

First, the truck 3 with the surface plate 2 mounted thereon is stopped immediately below the treating apparatus, and the mold halves 1a and 1b are put together to assemble the mold. In this case, leakage of the molten metal in the melting and treating operation is prevented as by providing a clamp member at a position associated with the dividing plane of the mold 1 or forcing the mold halves 1a and 1b into contact with each other.

In this mold assemblying step, the required amount of slag forming flux or the remaining slag powder used in the preceding process is charged into the mold. Subsequently, non-consumable electrodes 8a and 8b are lowered through holes 8a′ and 8b′ formed at the butting plane of shutters 10a and 10b until their front ends plunge into the slag, and electroslag melting is performed to form a predetermined amount of slag while feeding a shield gas, such as nitrogen, through the shield gas feed pipe 12. During this operation, the dust and exhaust gases produced in the treating system are drawn out through the duct 14 for discharge.

During formation of molten slag and while the oscillation feeder 6 is operated, the shutter 7′ of the chute 7 is opened to charge metal wastes into the bucket 4, and upon formation of a predetermined amount of molten slag, the shutters 10a and 10b are opened and the bucket 4 is lowered until it reaches the lower region in the mold, as shown in broken lines, where the bucket 4 is opened to discharge the metal wastes between the electrodes 8a and 8b and onto the molten slag, so that the wastes are melted by the sensible heat of the molten slag. The molten metal sinks down the slag to accumulatle on the bottom to form a pool of molten metal. As in the case of the usual electroslag melting, the portions of the melt adjacent to the bottom and sides of the water cooled mold are cooled so as to solidify. In addition, the bucket 4, completing the discharge of the wastes, is lifted to its shunted position by the cylinder 5, followed by the closing of the shutters 10a and 10b to prevent said bucket and superstructure from being damaged by the radiant heat from the melt while the material to be treated is fed into the bucket 4 from the chute. Upon collection of a predetermined amount of said material in the bucket 4, the shutter 7′ of the chute 7′ is closed and the shutters 10a and 10b are opened to allow the lowering of the bucket 4 to charge the material again onto the molten slag.

Thereafter this operation is repeated, whereby the amount of material to be treated gradually increases and at the same time the molten slag level rises. Thus, the electrodes 8a and 8b are upwardly moved to their optimum positions by the cylinders 9a and 9b while detecting the molten slag level by any suitable means.

Figure 4:
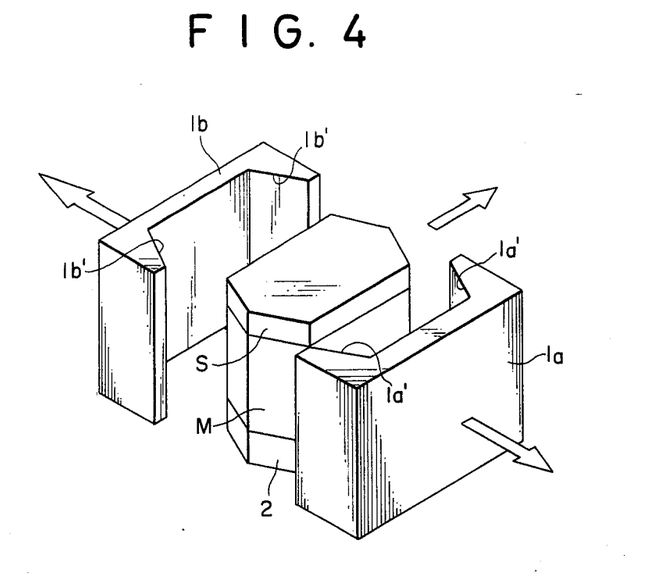
FIG. 4 is an explanatory view showing how a solidified mass is taken out upon completion of the melting and treating operation.
Figure 5:
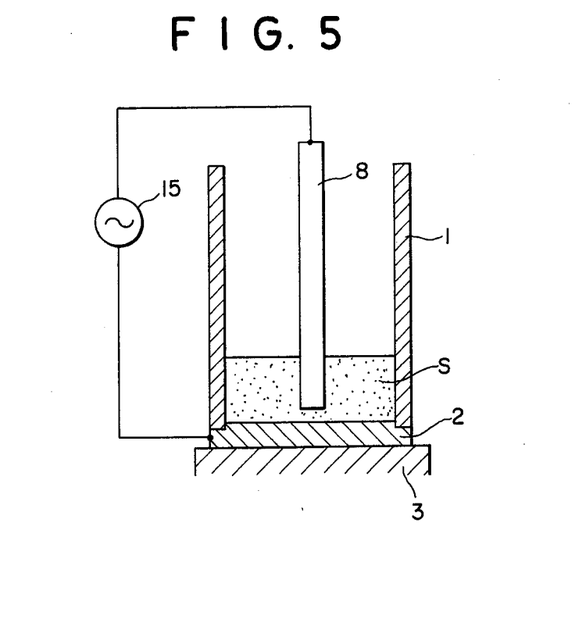
FIG. 5 is a schematic section showing a slag melt starting method.

Upon completion of the melting and treating of the material, the non-consumable electrodes 8a and 8b are lifted to their shunted position and the melt is cooled to solidify. The solidified mass, as shown in FIG. 4 (sketch), comprises the metal M and slag S which are solidified in layers. When the mold halves 1a and 1b are moved away from each other, the mass can be carried out as mounted on the surface plate 2. In this case, since the mold halves 1a and 1b are formed with inner taper surfaces 1a' and 1b' with the distance therebetween increasing toward the plane of division, the solidified mass can be removed from the mold by simply moving the mold halves 1a and 1b away from each other.

The apparatus of the present invention is operated in a procedure such as the one described above, and at any rate all the steps ranging from the charging of the material to be treated to the melting and treating of the same are performed in the sealed system, while the exhaust gases are constantly drawn out through the duct 14 to a predetermined gas treating device where they are treated, so that there is no danger of harmful materials leaking into the outside of the system. Further, during the melting and treating operation, since the bucket 4, etc., are shut off from the mold by the shutters 10a and 10b, there is no danger of these components being warped or degraded by the heat during melting. In the case of treatment of radioactive metal wastes, since the radioactive materials adhering to the metal are absorbed by the slag during the melting and treating operation, the radioactivity level of the solidified metal M can be greatly decreased, and where the degree of pollutant removal is high, the solidified mass may be dumped somewhere, and in some cases, may be reused as a raw material for building.

In the actual design of the apparatus described above, various parts may be changed within a range which fits the purpose stated herein and auxiliary devices or components may be provided within said range. For example, the shape of the shutters 7', 10a, 10b and their opening and closing mechanisms, the shape of the bucket 4 and its opening and closing mechanism and its lifting mechanism, the means for charging the material to be treated into the bucket 4, and the number of non-consumable electrodes and the mechanism for lifting and lowering the same are not limited to those illustrated and may be changed as required. Further, in the case of applying the invention to the melting and treating of radioactive metal wastes as described above, it should be so arranged that said operation can be performed without an operator or be remotely controlled. To this end, it is effective to prepare a sequence which makes it possible to synchronously perform the opening and closing of the shutters 7', 10a, 10b, the lifting and lower-ing and the opening and closing of the bucket 4, the lifting and lower-ing of the non-consumable electrodes 8a, 8b and the passage of electricity therethrough, and the movement of the mold halves 1a, 1b toward and away from each other.

In the electroslag melting method described above, slag which produces Joule heat upon passage of electric current therethrough is used, but since solid slag has so high an electric resistance as to substantially prevent passage of current therethrough, in embodying the present method it is necessary to melt the slag to render the latter electrically conductive so as to allow a sufficient amount of current to flow therethrough, which operation is generally referred to as the "slag melt starting method". The slag melt starting method is further classified as being a hot starting method and a cold starting method, and the latter being subdivided into an arc starting method and a submerged arc starting method. These methods have their own merits and demerits. More particularly, since the hot starting method requires separate melting equipment, the ESR method itself can be smoothly started and hence the quality of the ingot bottom is good, but the installation cost and maintenance become problems, and the problem of how to induce slag melt starting in the slag melting equipment remains to be solved. The arc start method comprises inserting electrodes into cutting scrap and producing arcs, the resulting arc heat being used to cause the melting of the slag to proceed. Depending upon the kind of the slag, however, the arc heat is insufficient to cause the melting of the slag to proceed smoothly because of its high melting point. Finally, the submerged arc starting method uses a special self-melting flux, thus having the disadvantage of making complex the component system of the slag for ESR. Thus, there is a need for developing a slag melt starting method wheel is free from these drawbacks. Since a melting and treating apparatus particularly for handling radioactive wastes as described above is operated under severe conditions, these are requirements that the melt start operation including all preparatory operations be easy and that the melt starting take place positively. Further, in the case of repeatedly using molten slag, it is necessary that the slag component system should not vary at each start.

Figure 8:
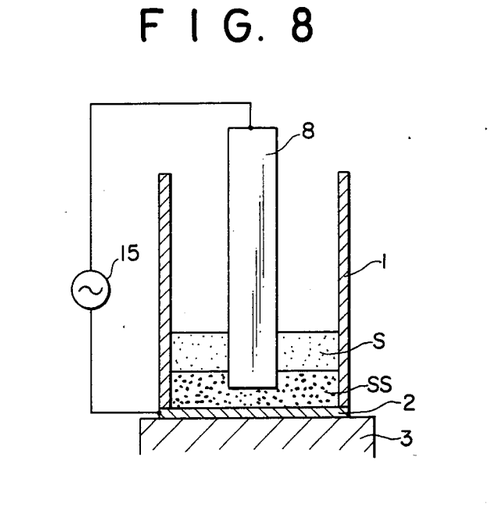
FIG. 8 is a schematic section showing another slag melt starting method.

The most common form of such slag melt starting method satisfying these requirements is the so-called surface plate arc method shown in FIG. 8. In this method, an electrically conductive surface plate 2 is placed on the bottom of the mold 1 (i.e., on the upper surface of the truck 3) and slag S is fed in. Electrodes 8 are then inserted into said slag layer and connected to the surface plate 2 through a power source 15. The electrodes 8 are brought into contact with the surface plate 2 for an instant to produce arcs to melt the slag by the arc heat. Thereafter, the resistance heat from the molten slag allows the melting of the slag to progress smoothly.

Figure 6:
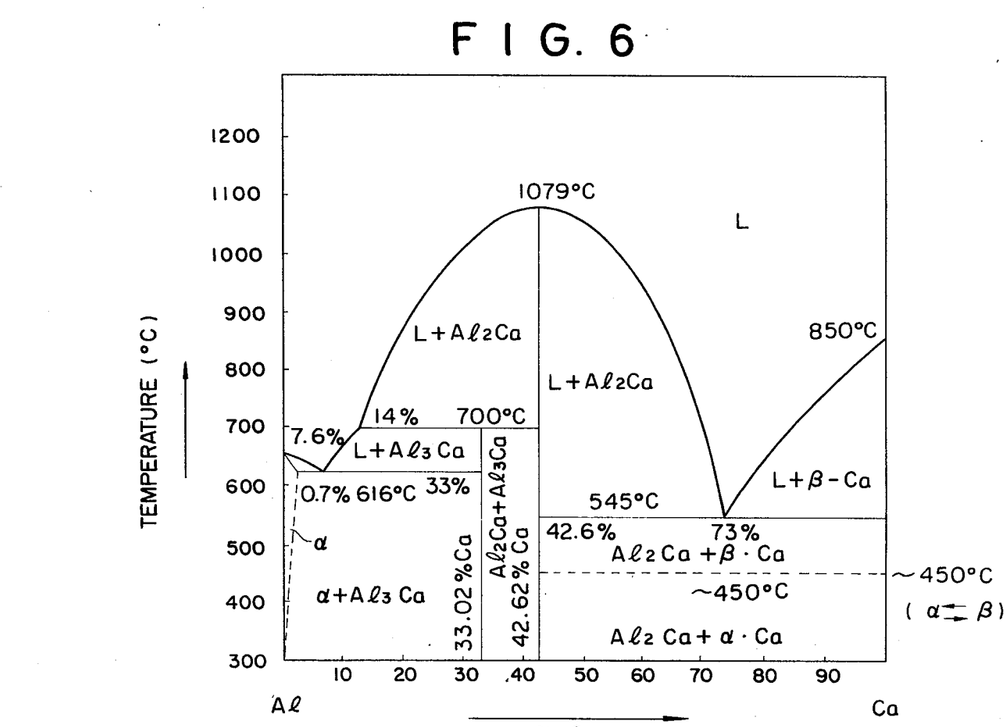
FIG. 6 is the phase diagram of the Ca-Al alloy system.

The melting of slag can also be started smoothly and quickly by charging slag and slag melt starting agent into the mold in layers and causing the melt starting agent to evolve heat. In this case, the most preferable slag melt start agent is a Ca-Al alloy. FIG. 6 is the standard phase diagram. When the metals Ca and Al are melted in a vacuum, such alloys as $Al_2Ca$ and $Al_3Ca$, and phases having CA or the like added to said alloys are obtained, all these being useful as slag melt starting agents.

Such slag melt starting agents are used sometimes in the form of a mass, but it is recommended to use them in pulverized form since it is desirable for them to have a larger surface area. More particularly, since Ca-Al alloys are ignited by arc heat or other heat and burnt to become oxides (CaO and $Al_2O_3$), the greater the surface area, the more readily they burn and the less the danger of the metals Ca and Al remaining after the melting of slag.

Figure 7:
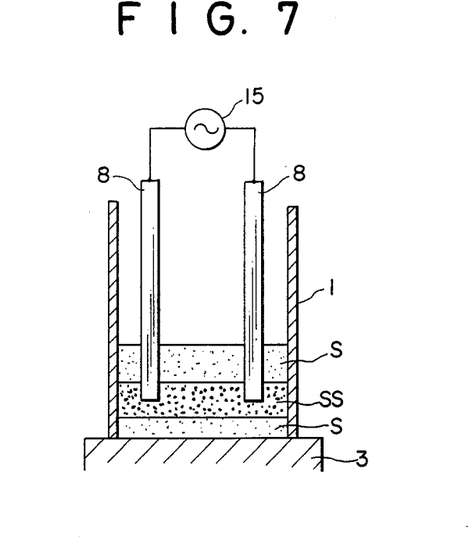
FIG. 7 is a schematic section of another slag melt starting method.

As for the means for causing slag melt starting agents to evolve heat, the flammability of Ca and Al may be utilized to ignite them directly by a suitable ignition source and allow them to burn. A simpler means is to make use of their electrical conductibility to produce arc heat. Concrete examples of the latter means include (1) a method comprising the steps of inserting two electrodes into the slag melt start agent layer, shortcircuiting the front ends of said electrodes by the starting agent, passing electric current therethrough to produce arc heat to thereby ignite the starting agent (in this method, there is no need to install a surface plate), and (2) a method comprising the steps of installing an electrically conductive surface plate on the lower side of the mold (i.e., on the upper surface of the carriage), inserting one or more electrodes until their front ends enter the slag melt starting agent layer, short-circuiting the electrodes and the surface plate by the slag melt starting agent, and passing electric current therethrough to produce arc heat to thereby ignite said starting agent. FIGS. 7 and 8 are schematic views illustrating said methods (1) and (2) showing a double electrode type and a single-electrode type, respectively. In these figures, the arrangement and operation of the mold 1, surface plate 2, truck 3 and electrodes 8, and the manner of charging of the slag and slag melt starting agent may be understood according to FIGS. 1-4, but the slag melt starting method to be described below may also be applied where electroslag melting is performed by using an ordinary mold and melting oven, besides the mold, etc., shown in FIGS. 1-4.

In the present invention, slag S and a slag melt starting agent SS are charged into the mold 1 in layers. FIGS. 7 and 8 show 8 layers and 2 layers, respectively, but there is no limitation on the lamination system, the thickness of lamination and the number of layers. For example, in the two-electrode system shown in FIG. 7, four of more layers may be provided.

To fully utilize the heat of combustion of the slag melt starting agent SS, however, it is recommended to cover the top surface layer with slag S at all times so as to minimize heat loss. If the top surface layer is formed of the slag melt starting agent SS (for example, in FIG. 8, a slag melt starting agent layer is formed on the top slag S) to the contrary to this concept, the resulting sandwich construction with the slag S interposed between the slag melt starting agent layers increases the melting rate of the slag S, though this construction is somewhat disadvantageous from the standpoint of material and heat.

In any case, the slag S and slag melt starting agent SS are alternately laid one upon the other, with the electrodes immersed in the slag melt starting agent SS. Applied between the electrode 8 and the surface plate 2 in FIG. 8 or between the electrodes 8 in FIG. 7 is an AC or DC power source 15 (in the figures, AC). Thus, since the slag melt start agent SS is a Ca-Al alloy of satisfactory electrical conductibility, passage of electricity takes place between the electrode 8 and surface plate 2 or between the electrodes 8, where arcs are produced. In FIG. 8, electric potential may be applied between the electrode 8 and the mold 1, in which case the order of lamination of the slag S and slag melt starting agent SS may be as shown in FIG. 7. While the slag S and slag melt starting agent SS have been described as being formed in separate layers, they may be mixed together and formed in a single layer in cases where the distance between the electrodes is sufficiently short or the relative amount of the slag melt starting agent is large.

Upon production of arcs in the manner described above, the slag begins to be melted by the arc heat, but in this case if the atmosphere around the Ca-Al alloy is an oxidizing atmosphere, combustion of the Ca-Al alloy takes place together with its ignition, and the heat of combustion causes the melting of the slag to progress. In addition, the flow of electric current at the time of arc start is somewhat unstable, but when a slag pool is formed adjacent the front end of the electrode, the current is stabilized and the melting of the slag by the Joule heat progresses further, so that the intended object is achieved. In this operation, since the Ca-Al alloy, once ignited, quickly burns even in an oxidizing atmosphere which is substantially the same as air, there is no possibility of Ca or Al remaining in the form of a metal after the slag has been melted, nor is the danger of making the properties of the molten slag unstable. Further, when burnt, Ca and Al form CaO and $Al_2O_3$, respectively. If slag for ESR is a system containing such oxides, there is an advantage that no disturbance takes place in the slag component system. Further, since the slag melt starting agent does not contain Si, there is no problem of forming $SiO_2$, which would lower the basicity of the slag. Accordingly, continuous use of slag is possible. For example, where radioactive metal wastes are treated, formation of secondary wastes is suppressed to a large extent. Since Ca-Al alloys are much safer than thermit agent, the slag melt starting operation is much less dangerous, having a high degree of versatility.

After the slag has been melted in this manner, metal wastes are charged into the mold, whereupon they sink to the bottom of the mold owing to the difference in specific gravity. Thus, electrodes are lowered from above the mold into the molten slag layer and electric current is passed therethrough, whereby the metal wastes can be efficiently melted. If a large amount of metal wastes is charged at once into the mold, the molten slag would be cooled to solidify. Therefore, it is desirable to charge metal wastes in small successive portions and, upon each charging, to pass electricity for heating so as to prevent solidification of the molten slag.

Advantages obtained by embodying the present invention are listed below.

(1) Metal wastes which are harmful to the human body can be melted and treated for reduction in volume is a closed system.

(2) Since the harmful components are arrested by the slag, the poisoning function of the treated metal is greatly reduced.

(3) The use of a slag melt start agent smoothens the starting of melting of slag.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of recovering metal from metal waste that has become contaminated by radioactive material by melting and treating the metal waste by an electroslag melting process, using a truck, a water-cooled cylindrical, bottom-opened mold divided in the middle thereof into first and second parts, a slag melt starting agent, slag, a lifting bucket, a plurality of shutters and a liftable nonconsumable electrode disposed above the mold, which comprises:

assembling on the upper surface of said truck said water-cooled, cylindrical mold having an open top and bottom and being divided substantially in the middle into a first and second part, said first and second part being horizontally movable toward and away from each other so as to close or open the mold;

charging said slag melt starting agent and said slag into the mold in layers by using said lifting bucket for charging a material to be treated disposed above said mold;

lifting said lifting bucket to a shunted position and shutting off said bucket and mold from each other by said plurality of shutters, lowering said liftable non-consumable electrode disposed above the mold, through a hole formed in said plurality of shutters until a front end portion thereof reaches said melt starting agent layer, passing electricity therethrough to ignite the slag melt starting agent to start melting of the slag and continuing passage of electricity to melt the slag, lifting the non-consumable electrode to its shunted position, opening the plurality of shutters and charging said contaminated metal waste into the mold by using said lifting bucket;

closing the plurality of shutters, blowing inert gas into the mold, lowering the non-consumable electrode until the front end thereof is immersed in the molten slag layer and passing electricity to melt the metal wastes by Joule heat; and means for trapping at least some of said radioactive material in said slag.

* * * * *